UNITED STATES PATENT OFFICE.

MAX HARTMANN, OF BASEL, SWITZERLAND, ASSIGNOR TO SOCIETY OF CHEMICAL INDUSTRY IN BASLE, OF BASEL, SWITZERLAND.

THERAPEUTICALLY-VALUABLE DERIVATIVES OF PARA-AMINOPHENOL.

1,263,238.  Specification of Letters Patent.  Patented Apr. 16, 1918.

No Drawing. Application filed June 29, 1917. Serial No. 177,825.

*To all whom it may concern:*

Be it known that I, MAX HARTMANN, chemist, a citizen of the Swiss Republic, and resident of Basel, Switzerland, have invented new and useful Therapeutically-Valuable Derivatives of Para-Aminophenol, of which the following is a full, clear, and exact specification.

I have found that by acylating para-aminophenolallylether with aliphatic acids, their anhydrids and halogenids, there are obtained thereapeutically valuable derivatives of para-aminophenol, having entirely different actions on the organism than the hitherto known derivatives of para-aminophenol. The paraaminophenolallylether being itself described in the literature as a poisonous substance, it is very surprising that by its acylation according to the process of the present application it may be converted into new substances, which act not as poisons, when administered in therapeutical doses, and are, in contradistinction to the corresponding phenetidin compounds, strong soporifics having furthermore sedative and antineuralgic properties. Thus, for instance, the paracetaminophenolallylether is a strong narcotic, while phenacetin itself does not show a narcotic action even when administered in larger doses, and the corresponding lactyl, isovaleryl and bromisovaleryl compounds and other acylderivatives of paraaminophenolallylether, prepared according to the present invention, act in a similar manner.

The new compounds are prepared by acting with aliphatic acids, their anhydrids or their halogenids on para-aminophenolallylether, if desired in the presence of convenient diluents or condensing agents. Instead of the free base its hydrochlorate can be employed, if simultaneously sodium acetate free of water or another agent capable of binding acid be added to the mass of reaction. When halogenids of aliphatic acids are employed, it is advantageous to add to the reaction mass a solvent or a diluent, as for instance ether, benzene, chloroform, etc., and sodium carbonate or another agent capable of binding acid.

The new compounds constitute well crystallized substances easily soluble in alcohol, ether and other organic solvents and sufficiently soluble in water.

The process is illustrated by the following examples:

Example 1: 151 grams of paraaminophenolallylether are boiled with 300 grams of acetic anhydrid, for several hours, in a reflux apparatus and hereafter the mass of reaction is poured into water. The paracetaminophenolallylether thus formed stiffens immediately and constitutes, when recrystallized from water or dilute alcohol, bright leaflets melting at 94° C. It dissolves easily in alcohol, ether and acetone, and sufficiently in hot water.

Example 2: 187 grams of paraminophenolallylether hydrochlorate are boiled with 300 grams of acetic anhydrid and 100 gr. of sodium acetate free of water, for several hours and the product of reaction is precipitated by pouring the reaction mass in water. The product obtained is identical with the paracetaminophenolallylether of Example 1.

Example 3: 151 grams of paraminophenolallylether are heated with 72 grams of lactic anhydrid (lactid) on an oil bath for 6 hours at 150° C. By pouring the reaction mass into water, the lactylaminophenolallylether separates in a crystalline form. It constitutes bright leaflets melting at 87° C. and dissolving easily in alcohol, ether and benzene and sufficiently in hot water.

Example 4: To 151 grams of paraaminophenolallylether heated to 105° C. are added by drops 102 grams of isovalerianic acid. The water resulting from the reaction is successively evaporated. The reaction is terminated by heating for several hours at 150° C. and the reaction product is crystallized from water or dilute alcohol. The isovaleryl-paraamino-phenolallylether thus obtained constitutes bright small needles melting at 95° C.

Example 5: 151 grams of paraaminophenolallylether are dissolved in 500 grams of ether and to the solution thus obtained are added first 150 grams of sodium carbonate free of water and afterward, while stirring, by drops 244 grams of alphabromisovalerylbromid. The stirring is continued until complete disappearing of this latter, the product of reaction is separated from sodium bromid and from sodium carbonate by filtration and the ether is evaporated. The remaining alphabromisovalerylparaaminophenolallylether constitutes, when recrystallized from alcohol, white bright leaflets melting at 131° C.

What I claim is:

1. The herein described therapeutically valuable acylderivatives of paraaminophenolallylether, which constitute well crystallized substances, sufficiently soluble in water and readily soluble in alcohol, ether and other organic solvents and act as soporifics having also sedative and antineuralgic properties.

2. As a new article of manufacture, the herein described therapeutically valuable paraacetaminophenolallylether which constitutes bright leaflets melting at 94° C. and dissolves readily in alcohol, ether and acetone and less readily in hot water and acts as a narcotic having also sedative and antineuralgic properties.

In witness whereof I have hereunto signed my name this eighth day of June, 1917, in the presence of two subscribing witnesses.

MAX HARTMANN.

Witnesses:
CARL O. SPAMER,
AMAND RITTER.

Copies of this patent may be obtained for five cents each, by addressing the "Commissioner of Patents, Washington, D. C."